United States Patent [19]

Manaras

[11] Patent Number: 5,357,053
[45] Date of Patent: Oct. 18, 1994

[54] SAFETY BASEBOARD MOLDING FOR CONCEALING INDOOR DOMESTIC WIRING

[76] Inventor: George Manaras, 1194 Tecumseh, Dollard-des-Ormeaux, Québec, Canada, H9B 2Y9

[21] Appl. No.: 941,888

[22] Filed: Sep. 8, 1992

[30] Foreign Application Priority Data

Mar. 4, 1992 [CA] Canada ................................. 2062256

[51] Int. Cl.[5] ............................................. H02G 3/26
[52] U.S. Cl. ................................... 174/48; 174/101
[58] Field of Search .................... 174/48, 49, 67, 101; 439/135, 147, 216

[56] References Cited

U.S. PATENT DOCUMENTS

| | | | |
|---|---|---|---|
| 2,023,004 | 12/1935 | Clayton | 439/216 |
| 2,190,196 | 2/1940 | Semenyna | 439/216 |
| 2,415,602 | 2/1947 | Monaco | 174/67 |
| 2,561,031 | 7/1951 | Murphy | 439/216 |
| 2,855,578 | 10/1958 | Hirsch | 439/135 X |
| 3,175,031 | 3/1965 | Reiner | 174/48 |
| 3,262,083 | 7/1966 | Gooding | 439/216 |
| 3,598,900 | 8/1971 | Drake | 174/138 F |
| 3,721,762 | 3/1973 | Gooding | 174/48 |
| 3,806,858 | 4/1974 | Larsile | 439/216 |
| 3,855,413 | 12/1974 | Baillie | 174/48 |
| 3,890,459 | 6/1975 | Caveney | 174/101 |
| 3,996,415 | 12/1976 | Provorse | 174/48 |
| 4,305,430 | 12/1981 | Svensson | 174/48 X |
| 4,477,694 | 10/1984 | Kohaut | 174/48 |

Primary Examiner—Leo P. Picard
Assistant Examiner—David Tone
Attorney, Agent, or Firm—Swabey Ogilvy Renault

[57] ABSTRACT

A decorative baseboard molding for concealing the wiring of an appliance comprises an elongated retainer clip mounted to a wall and an elongated cover removably mounted to the retainer clip. The retainer clip and the cover define, when assembled, an elongated channel which receives therein the wiring. A top wall of the retainer clip defines horizontally spaced apart openings through which the wiring can be passed. Therefore, the wiring of the appliance is laid in the channel between a first and a second of the openings thereof located adjacent the appliance and the wall outlet. The molding also includes a wall outlet cover which is adapted to be mounted to the wall while encasing therein the mural plate and the plug of the appliance. A vertical hollow sleeve is mounted against the wall between the wall outlet cover and the elongated channel defined by the assembly of the retainer clip with the cover. The wall outlet cover prevents, for instance, children from accessing the electrical plugs of the appliances and pets from chewing on the wiring thereof.

20 Claims, 2 Drawing Sheets

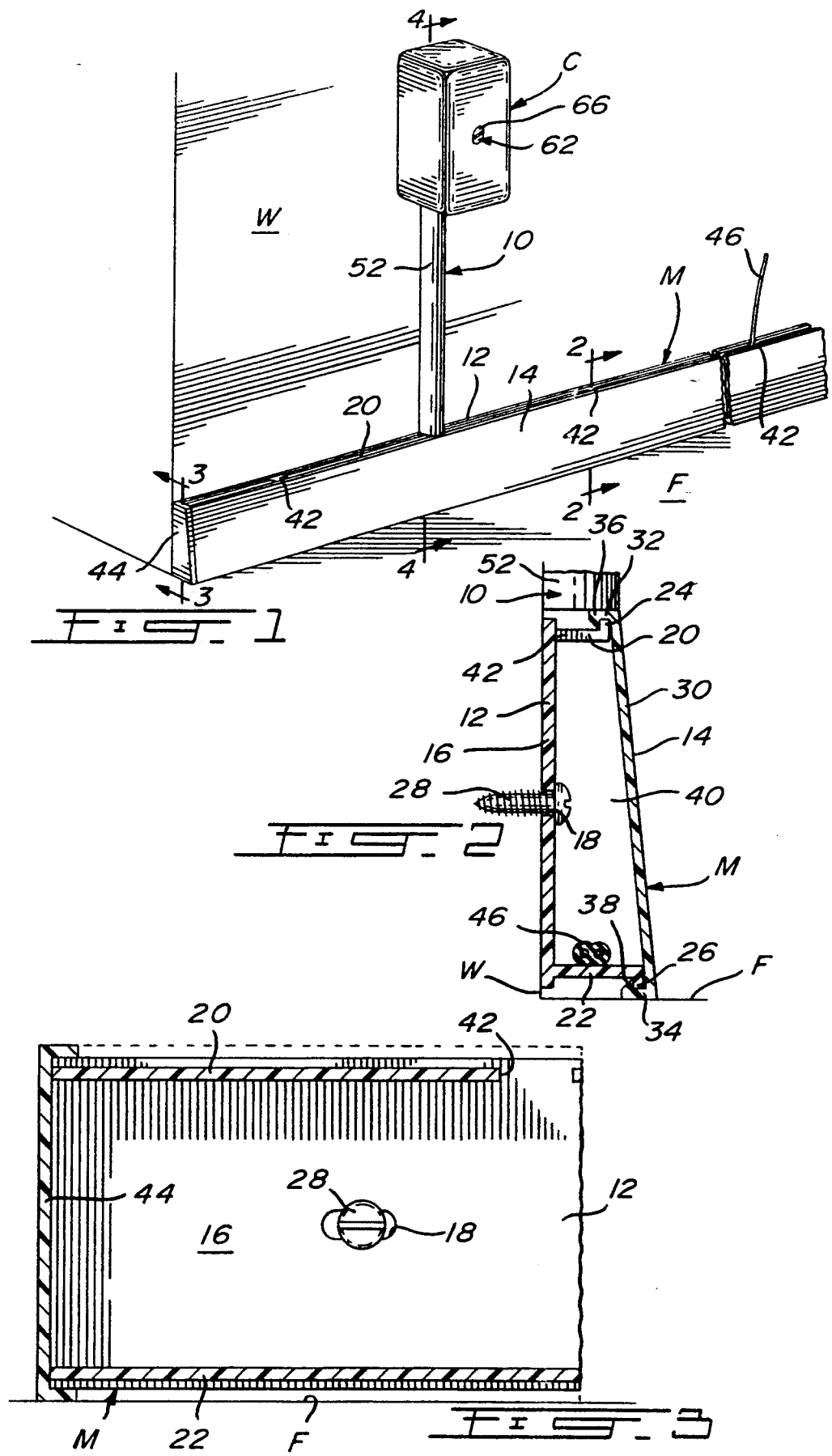

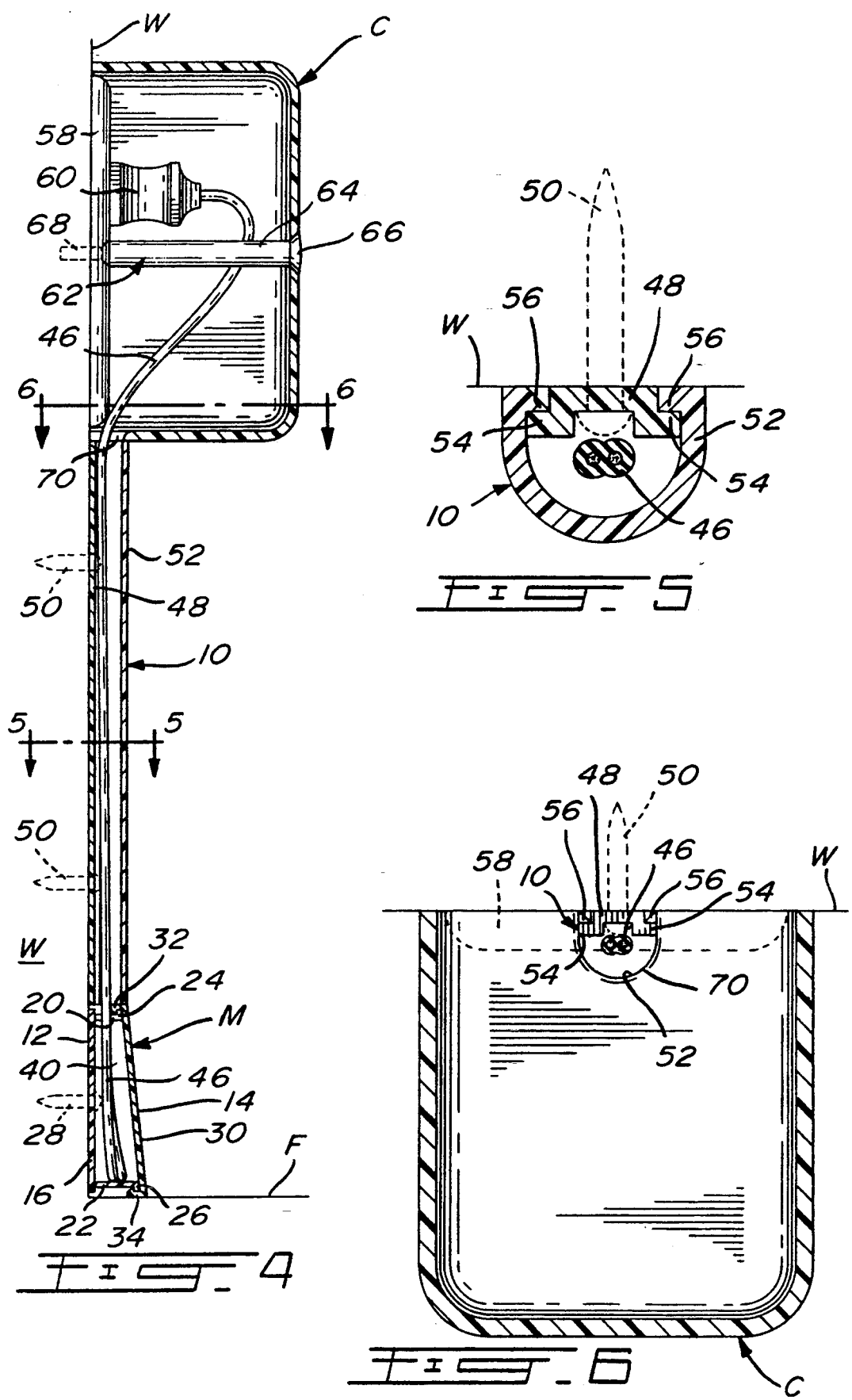

SAFETY BASEBOARD MOLDING FOR CONCEALING INDOOR DOMESTIC WIRING

BACKGROUND OF THE INVENTION

1. Field of the Invention

The present invention relates to baseboard moldings for safely concealing indoor electrical wiring and, more particularly, for concealing the wiring and terminal wall plugs of appliances, such as televisions, audio systems, lamps, etc.

2. Description of the Prior Art

Prior art devices has disclosed various electrical wiring systems which include raceways provided in the interior sidewalls of a building. For instance, in U.S. Pat. No. 2,023,004 issued to Clayton on Dec. 3, 1935, there is disclosed a raceway mounted in the sidewall of a building and defining openings which may be closed by blank disks or by knockout members. The blank disks or the knockout members are removed to reveal apertures when additional outlets are desired to be made available for the user. Such electrical raceways are laid when the building is constructed and facilitate the addition of new electrical wall outlets by an electrician without having to run additional wires through the walls of the building.

U.S. Pat. No. 3,721,762 issued to Gooding on Mar. 20, 1973 discloses an electrical raceway in combination to a decorative molding for hiding wires running through the raceway and which are used for installing additional wall outlets along the molding. The raceway is provided with separate channels along which different types of wiring extend. The structure provides access for the modification of the wiring system. The electrical raceway and decorative molding combination includes a retainer clip which is adapted to be secured to a wall and a removable cover member mounted thereon.

From the above, it is readily understood that prior art moldings, such as the molding of U.S. Pat. No. 3,721,762, are intended to provide access for the modification of a wiring system of a building. These modifications are carried out by an electrician and, at least, necessitate some precautionary measures as removal of the enclosure of the wires provides access to bare-ended wires.

SUMMARY OF THE INVENTION

It is therefore an aim of the present invention to provide a decorative molding for concealing the electrical wires of domestic appliances, such as televisions, audio systems, lamps, etc., between the appliance and the electrical wall outlet.

It is also an aim of the present invention to provide a domestic baseboard molding combination with a wall outlet cover assembly order to limit access to the appliance wiring and to deny access to the wall outlet.

Therefore, in accordance with the present invention, there is provided a molding for concealing the wiring of an appliance and comprising an elongated member adapted to be mounted to a wall, and an elongated cover means adapted to be removably engaged to the elongated member. The elongated member and the cover means define, when assembled, an elongated channel adapted to receive therein the wiring. The molding is adapted to define horizontally spaced apart openings with the wiring being insertable therein. Therefore, at least part of the wiring of the appliance can be laid in the channel and can be passed through a first and a second of the openings for emerging from the molding respectively adjacent the appliance and the wall outlet associated therewith.

Also in accordance with the present invention, there is provided the molding as described hereinabove in combination with a channel means and a wall outlet cover means. The wall outlet cover means is adapted to be mounted over the wall outlet and over a plug provided at the end of the wiring. The channel means is adapted to be mounted between the second opening of the molding and the wall outlet cover means. The channel means is also adapted for longitudinally receiving and concealing therein the wiring. Therefore, the wiring and a terminating plug thereof are completely concealed from the first opening of the molding to the wall outlet.

Also in accordance with the present invention, there is provided a safety device for an electrical wall outlet which comprises a cover means and at least one mounting means adapted for mounting the cover means to a wall while encasing therein a mural plate of the wall outlet and any electrical plug inserted in the wall outlet. The mounting means includes at opposed ends thereof a head section and a first section adapted for engagement in the wall. The mounting means also includes a second section adapted to maintain the mural plate against the wall when the head section maintains by abutment the cover means against the wall while the first section is engaged in the wall. The cover means is adapted for allowing a wiring of the plug to extend therethrough.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a fragmented perspective view of a baseboard molding in accordance with the present invention, in combination with a safety wall outlet cover also in accordance with the present invention;

FIG. 2 is a cross-sectional side view taken along lines 2—2 of FIG. 1;

FIG. 3 is a cross-sectional elevation view taken along lines 3—3 of FIG. 1;

FIG. 4 is a cross-sectional side view taken along lines 4—4 of FIG. 1;

FIG. 5 is a cross-sectional top plan view taken along lines 5—5 of FIG. 4; and

FIG. 6 is a cross-sectional top plan view taken along lines 6—6 of FIG. 4.

DESCRIPTION OF THE PREFERRED EMBODIMENTS

In accordance with the present invention, there is provided a decorative baseboard molding M in combination with a wall outlet cover C and a connection sleeve 10. As it will be understood from the detailed description which follows hereinafter, the present invention provides an enclosure for concealing wires of domestic appliances, such as televisions, audio systems, lamps, etc., substantially from the appliance itself to its electrical connection in a wall outlet. Therefore, a number of wires can be run in the baseboard molding M and thus be aesthetically concealed thereby. Consequently, the baseboard molding M, the wall outlet cover C and the sleeve 10 in accordance with the present invention, in addition to aesthetically hiding the wires, deny access to the wires thereby safely guarding against dangerous occurrences, such as children accessing the plug of the wire and the wall socket and pets (dogs) chewing on the wires and being electrocuted.

The baseboard molding M consists of an elongated retainer clip 12 and an elongated cover member 14 removably mounted to the retainer clip 12. The retainer clip 12 and the cover member 14 are preferably formed of plastic extrusions. The retainer clip 12 includes a plane rear wall 16 which defines a series of horizontally spaced apart oblong apertures 18, a horizontal top wall 20 and a horizontal bottom wall 22. The top and bottom walls 20 and 22 respectively include vertical flanges 24 and 26 at their respective free ends. As seen in FIGS. 2 to 4, screws 28 are used for mounting the rear wall 16 and thus the retainer clip 12 to a wall W of the building adjacent a floor F thereof.

The cover member 14 consists of a flat inclined wall 30 which includes at its upper and lower longitudinal edges rearward extending top and bottom flanges 32 and 34, respectively. The top and bottom flanges 32 and 34 terminate respectively with hook portions 36 and 38 which are adapted to engage, when the cover member 14 is mounted to the retainer clip 12, the top and bottom flanges 24 and 26 of the top and bottom walls 20 and 22 of the retainer clip 12.

Therefore, it is easily seen that the combination of the retainer clip 12 and the cover member 14, when assembled, define an elongated channel 40 in which the wires of various appliances can be laid.

A top wall 20 of the retainer clip 12 defines spaced apart openings 42 each having transverse dimensions corresponding substantially to those of the domestic wires intended to be passed therethrough for connection to a standard wall outlet. The openings 42 should, in conventional use, be dimensioned for accommodating two sets of wires, that is the wires of two appliances as the wall outlet can receive two plugs. These openings 42, asides from allowing the wires of the appliances to be passed through the baseboard molding M, also allow for the heat generated by the wires to escape from the baseboard molding M. It is noted that the openings 42 are formed by transverse slots defined in the top wall 20 of the retainer clip 12 which become closed at their open ends when the cover member 14 is mounted to the retainer clip 12 thereby forming the rectangular openings 42. In any event, only the wires are insertable in the slots or openings 42, and not the plugs which terminate the wires.

The baseboard moldings M can be manufactured in different standard lengths or can be cut to the desired length by the user. End caps 44 are provided to close the ends of the channel 40 defined in the baseboard molding M.

Accordingly, wire 46 of FIG. 1 belongs to a domestic appliance, such as a television, a sound system, a lamp, etc. The wire 46 is inserted in the baseboard molding M through the opening 42 that is closest thereto. The wire 46 is then laid in the baseboard molding M and comes out therefrom through a further opening 42 which lies vertically opposite the intended wall outlet. The wire 46, between the baseboard molding M and the wall outlet cover C, extends through the sleeve 10 which comprises, as best seen in FIGS. 4 and 5, a retainer clip 48 mounted to the wall W by way of a series of spaced apart screws 50, and a covering channel 52 removably mounted on the retainer clip 48. The covering channel 52, as seen in FIG. 5, is of partly rounded cross-section, although this covering channel 52 could also be made with a square cross-section. Both the retainer clip 48 and the covering channel 52 are made of an extruded plastics material, with the covering channel 52 defining an open structure, whereby it includes sufficient elasticity in order that it can be removably mounted to the retainer clip 48.

As best seen in FIG. 5, the retainer clip 48 defines a pair of longitudinal shoulders 54 which are slightly spaced apart from the wall W. For engagement to these shoulders 54 of the retainer clip 48, the covering channel 52 comprises a pair of inwardly projecting elongated flanges 56 which are adapted to fit behind the shoulders 54 of the retainer clip 48.

The sleeve 10 is positioned over the top wall 20 of the baseboard molding M concentrically around the opening 42 thereof through which the wire 46 extends to reach a wall plate of a wall outlet 58.

Above the upper end of the sleeve 10 is mounted the wall outlet cover C which completely encases the wall outlet 58 and also a plug 60 provided at the end of the wire 46 and engaged in the wall outlet 58. As seen in FIGS. 4 and 6, the cover C which is of rectangular cross-sections is mounted over the wall outlet 58 by way of a special screw 62 which includes an enlarged section 64 located between a head 66 and the threads 68 thereof. Therefore, the screw 62 secures to the wall W both the wall outlet 58 and the cover C. The screw 62 thus replaces the conventional short screw used centrally on the wall outlet 58 to mount it to the wall W. The lower wall of the cover C defines a partly circular opening 70 into which is slid the upper end of the sleeve 10, as best seen in FIG. 6.

A typical installation of the baseboard molding M, the sleeve 10 and the wall outlet cover C follows hereinbelow. First, the retainer clip 12 of the baseboard molding M is mounted to the wall W by way of the screws 28 with one opening 42 being positioned vertically below the wall outlet 58. Then, the wire 46 is inserted in a further one of the openings 42 which is located adjacent the appliance. The wire 46 is then laid along the bottom wall 22 of the retainer clip 12 and passed through the opening 42 located opposite the wall outlet 58. The cover member 14 is then assembled to the retainer clip 12 to hide the wire 46 while preventing the wire from disengaging from the openings 42 of the top wall 20 of the retainer clip 12. The end caps 4 are afterwards fitted to the ends of the structure formed by the assembly of the retainer clip 12 with the cover member 14.

The retainer clip 48 of the sleeve C is then mounted to the wall W by way of the screws 50, although the retainer clip 48 could also be mounted to the wall W just after the positioning of the retainer clip 12 of the baseboard molding M. The wire 46 is then extended along the retainer clip 48 and possibly engaged in the wall outlet 58 by way of its plug 60 while the covering channel 52 is assembled to the retainer clip 48. The wall outlet cover C is then mounted to the wall W using the special screw 62 which also secures the wall outlet 58 to the wall in replacement of the standard small screw normally used to mount the wall outlet 58 to the wall W.

It is easily seen from the above that additional holes can be defined, for instance, by way of a drill or cutters, in the top wall 22 of the retainer clip 12 of the baseboard molding M for accommodating wires at other locations along the baseboard molding M than those offered by the openings 42. It is also contemplated to possibly have knockout openings defined in a spaced apart relationship along the top wall 20 of the retainer clip 12. Furthermore, a flexible protective sheath is also contemplated for protecting the wire 46 between the appliance and the entry of the wire 46 in the baseboard molding M.

It is easily understood from the above that the baseboard molding M, the sleeve 10 and the wall outlet cover C in accordance with the present invention provide for a decorative and safety oriented enclosure for the wires of various domestic appliances. By concealing the wires and the socket, children cannot play with the plug 60 or with the wall outlet 58 itself which could result in electrocution of the children. Furthermore, pets, such as dogs, are prevented from chewing on the wires and ruining the same in addition to possibly injuring themselves.

I claim:

1. A molding for concealing the wiring of an appliance comprising an elongated member adapted to be mounted at least to one of a wall and a floor, and an elongated cover means adapted to be removably engaged to said elongated member, said elongated member means and said cover means defining, when assembled, an elongated channel adapted to receive therein the wiring and defining horizontally spaced apart openings with the wiring being insertable therein, said openings for passing wiring being only defined on a top wall of said molding, whereby at least part of the wiring of the appliance can be laid in said channel and can be passed through a first and a second of said openings for emerging from said molding respectively adjacent the appliance and a wall outlet associated therewith.

2. A molding as defined in claim 1, wherein said elongated member is adapted to be mounted to the wall, and wherein said molding is adapted to be mounted for contacting a floor.

3. A molding as defined in claim 1, wherein said elongated member comprises retainer means including a plane rear wall adapted to be applied against the wall, and top and bottom walls extending horizontally from said rear wall, said cover means comprising a plane front wall, engagement means being provided on said top and bottom walls of said retainer means and on said front wall of said cover means for assembling said molding.

4. A molding as defined in claim 3, wherein said openings are defined equidistantly along said top wall of said retainer means.

5. A molding as defined in claim 3, wherein said engagement means comprises top and bottom flanges extending respectively upwards and downwards from said top and bottom walls of said retainer means, and hook means extending rearwards from upper and lower edges of said front wall of said cover means, said hook means being adapted to be clipped to said top and bottom flanges.

6. A molding as defined in claim 3, wherein horizontally extending oblong holes are equidistantly defined in a horizontal spaced apart relationship along said rear wall of said retainer means, whereby screws or nails can extend through said holes into the wall for mounting said molding thereto.

7. A molding as defined in claim 1, wherein said molding comprises end caps adapted to be fitted at longitudinal ends of said molding for closing said channel.

8. A molding for concealing the wiring of an appliance comprising an elongated member adapted to be mounted at least to one of a wall and a floor, and an elongated cover means adapted to be removably engaged to said elongated member, said elongated member means and said cover means defining, when assembled, an elongated channel adapted to receive therein the wiring, said molding being adapted for defining horizontally spaced apart openings on a top wall of said molding with the wiring being insertable therein, whereby at least part of the wiring of the appliance can be laid in said channel and can be passed through a first and a second of said openings for emerging from said molding respectively adjacent the appliance and a wall outlet associated therewith, said elongated member comprising a substantially plane rear wall adapted to be applied against the wall, and top and bottom walls extending horizontally from said rear wall, said cover means comprising a plane front wall, said front wall of said cover means being inclined and being further distanced at a lower end thereof from said rear wall of said elongated member than at an upper end thereof.

9. A molding as defined in claim 6, wherein top and bottom flanges extend respectively upwards and downwards from said top and bottom walls of said elongated member, hook means extending rearwards from upper and lower edges of said front wall of said cover means, said hook means being adapted to be clipped to said top and bottom flanges.

10. A molding for concealing the wiring of an appliance comprising an elongated member adapted to be mounted at least to one of a wall and a floor, and an elongated cover means adapted to be removably engaged to said elongated member, said elongated member means and said cover means defining, when assembled, an elongated channel adapted to receive therein the wiring and defining horizontally spaced apart openings with the wiring being insertable therein, whereby at least part of the wiring of the appliance can be laid in said channel and can be passed through a first and a second of said openings for emerging from said molding respectively adjacent the appliance and a wall outlet associated therewith, in combination with a channel means and a wall outlet cover means, said wall outlet cover means being adapted to be mounted over the wall outlet and over a plug provided at the end of the wiring, said channel means being adapted to be mounted between said second opening of said molding and said wall outlet cover means and being adapted for receiving and concealing therein the wiring, whereby the wiring and a terminal plug thereof are completely concealed from said first opening of said molding to the wall outlet.

11. A molding as defined in claim 10, wherein said channel means comprises a retainer clip adapted to be mounted to the wall and a covering channel adapted to be removably mounted to said retainer clip, the wiring extending longitudinally between said retainer clip and said covering channel.

12. A molding as defined in claim 11, wherein said retainer clip comprises a plane rear wall adapted to be applied against the wall, and a pair of longitudinal shoulders on each side thereof, said covering channel having a generally U-shaped cross-section and including a pair of inwardly projecting flanges extending from the free ends thereof and adapted to be each engaged behind a respective one of said shoulders of said retainer clip.

13. A molding as defined in claim 10, wherein said outlet cover means comprises a screw including a head and a threaded section at opposed ends thereof, and a mural plate abutting section therebetween, said head being adapted to abut a front wall of said wall outlet cover means with said threaded section being adapted to engage the wall, whereby, when said head abuts said front wall of said wall outlet cover means, said threaded section is engaged in the wall and said abutting section abuts the mural plate for maintaining it against the wall.

14. A molding as defined in claim 9, wherein at least one mounting means is provided for mounting said cover means to the wall while encasing therein a mural plate of the wall outlet and any electrical plug inserted in the wall outlet, said mounting means including at opposed ends thereof a head section and a first section adapted for engagement in the wall, said mounting means also including a second section adapted to maintain the mural plate against the wall when said head section maintains by abutment said cover means against the wall with said first section being engaged in the wall, said cover means being adapted for allowing a wiring of the plug to extend therethrough.

15. A safety device as defined in claim 14, wherein said mounting means extend through the mural plate in an existing hole thereof.

16. A safety device as defined in claim 15, wherein said first section is threaded.

17. A safety device as defined in claim 16, wherein said second section is a cylindrical section larger than said first section extending from said head section to said threaded first section.

18. A safety device as defined in claim 17, wherein said head section and said cylindrical section each define a frusto-conical leading surface at locations thereof adapted for respectively abutting said cover means and the mural plate.

19. A molding as defined in claim 10, wherein said openings are defined equidistantly along a top wall of said molding.

20. A molding as defined in claim 10, wherein said elongated member comprises retainer means including a plane rear wall adapted to be applied against the wall, and top and bottom walls extending horizontally from said rear wall, said cover means comprising a plane front wall, engagement means being provided on said top and bottom walls of said retainer means and on said front wall of said cover means for assembling said molding, and wherein said engagement means comprises top and bottom flanges extending respectively upwards and downwards from said top and bottom walls of said retainer means, and hook means extending rearwards from upper and lower edges of said front wall of said cover means, said hook means being adapted to be clipped to said top and bottom flanges.

* * * * *